United States Patent [19]
Albers et al.

[11] Patent Number: 6,078,648
[45] Date of Patent: Jun. 20, 2000

[54] ADVANCED INTELLIGENT NETWORK (AIN) FUNCTIONALITY FOR ELECTRONIC SURVEILLANCE

[75] Inventors: Raymond F. Albers, Vienna; Charles H. Eppert, III, Fairfax; Robert D. Farris, Sterling, all of Va.; Barry P. Pershan, Olney, Md.; Michael G. Pilkerton, Fairfax, Va.

[73] Assignee: Bell Atlantic Network Services, Inc., Arlington, Va.

[21] Appl. No.: 09/112,473

[22] Filed: Jul. 9, 1998

[51] Int. Cl.[7] .................................................... H04M 1/24
[52] U.S. Cl. .............................. 379/35; 379/7; 379/213; 379/221
[58] Field of Search .......................... 379/1, 7–8, 34–35, 379/201, 207, 211–213, 219–221, 229–230

[56] References Cited

U.S. PATENT DOCUMENTS

| | | |
|---|---|---|
| 5,012,511 | 4/1991 | Hanle et al. . |
| 5,241,588 | 8/1993 | Babson, III et al. . |
| 5,247,571 | 9/1993 | Kay et al. . |
| 5,471,519 | 11/1995 | Howe et al. ............................. 379/67 |
| 5,475,732 | 12/1995 | Pester, III . |
| 5,572,583 | 11/1996 | Wheeler, Jr. et al. . |
| 5,590,171 | 12/1996 | Howe et al. ............................. 379/33 |
| 5,592,530 | 1/1997 | Brockman et al. . |
| 5,943,393 | 8/1999 | Howell .................................... 379/35 |

OTHER PUBLICATIONS

Federal Communications Commission. "First Report and Order and Further Notice of Proposed Rulemaking In the Matter of Telephone Number Portability," p.1–118, Appendices A–F (Jul. 2, 1996) & Erratum released Jul. 17, 1996.
Telecommunications Industry Association. "Lawfully Authorized Electronic Surveillance (Baseline Revision 10)," TR45.2, Subcommittee PN–3580 (Dec. 11, 1996).
Bell Atlantic Corporation, "Bell Atlantic Makes History by Providing Local Number Portability to Competitors in New York," p.1–3 (May 28, 1998).
Siemens Telecom Networks. "Acronym Guide: Siemens Telecom Networks: Local Number Portability," p.1 (Apr. 2, 1998).
Siemens Telecom Networks. "Topic 7: Siemens Telecom Networks: Local Number Portability Managing the Regional Databases," p.1 (Apr. 2, 1998).
Siemens Telecom Networks. "Topic 11: Siemens Telecom Networks: Local Number Portability: How Is a Telephone Number Ported?", p.1–2 (Apr. 2, 1998).
"Number Portability News and Links," p.1–7 (May 28, 1998).
Lucent Technologies. "Number Portability Technical Documents," p.1–2 (May 28, 1998).
Nortel. "Number Portability—LNP Background," p.1–4 (May 28, 1998).
Lucent Technologies. "Local Number Portability," p.1–2 (May 28, 1998).
Ovum. "Number Portability: Strategies for Market, Technical and Regulatory Success," p.1–3 (May 28, 1998).
"Midwest Region: Primer for Local Number Portability," Issue 2, p.1–31 (May 28, 1998).
Nortel. "Local Number Portability: LNP Backgrounder," p.1–4 (May 28, 1998).

*Primary Examiner*—Curtis A. Kuntz
*Assistant Examiner*—Duc Nguyen
*Attorney, Agent, or Firm*—McDermott, Will & Emery

[57] ABSTRACT

Following the Communications Assistance for Law Enforcement Act (CALEA), the FBI developed a standard set of communication services and interfaces for lawfully authorized electronic surveillance. For telephone communications, the current industry implementation of compliance with this standard involves deploying certain interface equipment in end office switches of the telephone network. However, the requisite surveillance functionality often resides in a certain limited number of offices. Where the target under surveillance receives service out of an office lacking the surveillance capability, the network routes the call through an office having the requisite capability. For this purpose, the invention relies on intelligent network processing, particularly variations on such processing normally used to implement local number portability. The control node supplying the routing information for local number portability also supplies routing information for surveillance related calls, in order to route calls to and from the target location through an office having the surveillance interfaces in a manner that is entirely hidden from the target and anyone communicating with the target.

20 Claims, 6 Drawing Sheets

ADVANCED INTELLIGENT NETWORK (AIN) FUNCTIONALITY FOR ELECTRONIC SURVEILLANCE

CROSS-REFERENCE TO RELATED APPLICATIONS

This application is related to patent application Ser. Nos. 09/112,154 and 09/112,155, filed Jul. 9, 1998, and filed Jul. 9,1998. Those applications are incorporated by reference herein in their entirety.

TECHNICAL FIELD

The present invention relates to a method and system for providing lawfully authorized electronic surveillance service in a Public Switched Telephone System (PSTN) and more particularly to configuring existing telephone networks using various types of switches to effectively and economically provide such service.

ACRONYMS

The written description uses a large number of acronyms to refer to various services, messages and system components. Although generally known, use of several of these acronyms is not strictly standardized in the art. For purposes of this discussion, acronyms therefore will be defined as follows:

Address Complete Message (ACM)
Advanced Intelligent Network (AIN)
American National Standards Institute (ANSI)
ANswer Message (ANM)
Automated Message Accounting (AMA)
Automatic Number Identification (ANI)
Call Processing Record (CPR)
Central Office (CO)
Common Channel Signaling (CCS)
Communications for Assistance for Law Enforcement Act (CALEA)
Custom Local Area Signaling Services (CLASS)
Federal Bureau of Investigation (FBI)
Generic Address Parameter (GAP)
Generic Data Interface (GDI)
Initial Address Message (IAM)
Integrated Service Control Point (ISCP)
Integrated Services Digital Network (ISDN)
ISDN User Part (ISUP)
Intelligent Peripheral (IP)
Local Access and Transport Area (LATA)
Local Number Portability (LNP)
Location Routing Number (LRN)
Multi-Services Application Platform (MSAP)
Numbering Plan Area (NPA)
Office Equipment (OE)
Origination Point Code (OPC)
Personal Communications Service (PCS)
Plain Old Telephone Service (POTS)
Point in Call (PIC)
Personal Identification Number (PIN)
Primary Rate Interface (PRI)
Public Switched Telephone Network (PSTN)
Records Accounting Office (RAO)
Record Change Memory Administration Center (RCMAC)
Remote Memory Administration System (RMAS)
Service Control Point (SCP)
Service Creation Environment (SCE)
Service Management System (SMS)
Service Switching Point (SSP)
Signaling System 7 (SS7)
Signaling Point (SP)
Signaling Transfer Point (STP)
Simplified Message Desk Interface (SMDI)
Speaker Identification/Verification (SIV)
Telecommunications Industry Association (TIA)
Terminating Attempt Trigger (TAT)
Time Slot Interchange (TSI)
Traffic Service Position System (TSPS)
Transaction Capabilities Applications Part (TCAP)
Transmission Control Protocol/Internet Protocol (TCP/IP)

BACKGROUND

Historically in the United States authorities such as city, state, or federal police authorities, may engage in electronic surveillance (frequently referred to in the vernacular as wire-tapping), when duly authorized to perform such an activity by a cognizant judicial authority. In earlier times, when public telephone service was virtually all analog the procedure was relatively simple. Assuming surveillance of a residence connected to the telephone network by a local loop consisting of a pair of copper wires, the usual practice was to locate a convenient cross connect and bridge on to the two wire analog circuit. The entity conducting the surveillance then engaged the serving telephone network operator or company to provide a circuit from that location to the law enforcement location. The law enforcement organization could then monitor the conversations, generally referred to as content, as well as the call set up and related signaling. Statistically approximately 90 percent of the authorized surveillance in the United States does not cover content but signaling data. Such events are referred to as Pen register taps.

With the widespread use of digital communication and control signaling, the simplicity and ease of the prior surveillance procedures has largely disappeared. As a result, law enforcement agencies, and cooperating Public Switched Telephone Networks (PSTNs), are forced to cope with a considerably more complex and costly substitute set of procedures. Partially in response to this situation Congress passed Public Law 103-414, the Communications Assistance for Law Enforcement Act (CALEA). The Telecommunications Industry Association (TIA), accredited by the American National Standards Institute (ANSI), was selected by the telecommunications industry to promulgate the industry's CALEA standard. TIA promptly initiated a standards program. Initial disagreements within industry were resolved, and TR45 Lawfully Authorized Electronic Surveillance SP-3580, Baseline Revision 10 was produced. These have become known as the "safe harbor" standards pending resolution of still outstanding differences with respect to certain preferences of the Federal Bureau of Investigation (FBI).

The CALEA specifications include the requisite that the target for surveillance continue to be provided with all subscribed enhanced, CLASS, and other services, and that the surveillance be completely transparent. The central office switches currently in use in the public switched telephone networks were not designed with CALEA functionalities in mind. As a result it is not surprising that not all types of existing switches are readily adapted to operate in a network that meets major CALEA requirements.

The basic surveillance problem has undergone continued evolution as telecommunications technology has advanced and provided the public with an ever-increasing variety of services. Illustrative of such services, which create added complexity for effective telephone surveillance, is call forwarding and particularly remotely activated call forwarding. Another example is central office based speed dialing.

Since the proposed CALEA requirements are worded in terms of service, i.e., monitoring the telephone service (signaling and speech) of the subject, and anything that can be accomplished with the service, significant problems are presented. This becomes particularly acute when coupled with a desire that the surveillance preferably be near universally applicable to all telephone central offices, including end offices that rely on legacy switches. One example of a specific problem is encountered with end offices using Lucent (formerly AT&T) 1AESS switches. These switches are among the earlier variety of stored program controlled switches and are rapidly being retired. As a consequence, it would not be wise to expend large sums to develop CALEA feature software for these switches. On the other hand the later Lucent 5ESS switches will be in service for many years to come and it may make sense to develop the requested surveillance capabilities in a number of network configurations. Cost considerations weigh heavily in selecting and providing an acceptable solution.

It is accordingly an object of the present invention to provide a relatively straightforward and cost effective solution to the foregoing problem.

DISCLOSURE OF THE INVENTION

The current implementation of compliance with the CALEA standard in the telephone industry involves deploying certain interface equipment in end office switches of the telephone network. However, the requisite surveillance functionality often resides in a certain limited number of offices. Where the target under surveillance receives service out of an office lacking the surveillance capability, the network routes the call through an office having the requisite capability. For this purpose the preferred embodiment of the invention relies on intelligent network processing, particularly variations on such processing normally used for a different purpose, i.e., to implement local number portability. When utilized in this new fashion, the control node supplying the routing information for local number portability also supplies routing information for surveillance related calls, in order to route calls to and from the target location through an office having the surveillance interfaces in a manner that is entirely hidden from the target and anyone communicating with the target.

For some years, the telephone industry has been developing intelligent network processing, performed in a network sometimes referred to as an Advanced Intelligent Network (AIN). In an AIN type system, local and/or toll offices of the public telephone network detect one of a number of call processing events identified as AIN "triggers". An office which detects a trigger will suspend call processing, compile a call data message and forward that message via a common channel signaling (CCS) link to a database system, such as an Integrated Service Control Point (ISCP) which includes a Multi-Services Application Platform (MSAP) database. If needed, the ISCP can instruct the central office to obtain and forward additional information. Once sufficient information about the call has reached the ISCP, the ISCP accesses its stored data tables in the MSAP database to translate the received message data into a call control message and returns the call control message to the office of the network via CCS link. The network offices then use the call control message to complete the particular call. An AIN type network for providing an Area Wide Centrex service, for example, was disclosed and described in detail in commonly assigned U.S. Pat. No. 5,247,571 to Kay et al., the disclosure of which is entirely incorporated herein by reference.

In an AIN network developed by the Regional Bell Operating Companies (RBOCs) and Bell Communications Research (Bellcore), a terminal and software system referred to as 'SPACE' functions as the service creation environment and/or service provisioning system for the AIN control functions in the Service Control Points (SCPs) and Integrated Service Control Points (ISCPs). For example, as disclosed in U.S. Pat. No. 5,241,588 Babson, III et al., customized call processing information records are created and/or modified in a graphical environment, by creating or modifying a customer's service graph on the display terminal. Data corresponding to the service graph is then stored in the SCP. Other terminal and software systems could be used to create and provision the AIN services. For AIN services today, however, telephone company personnel widely utilize the SPACE system to create templates for the service logic for new services. When customers subscribe to the services, the templates are filled in with the subscribers' data to create individual call processing records (CPRs). The CPRs are stored in a database in the ISCP, for controlling actual call processing.

Many of the enhanced communication services offered by the AIN control system permit a subscriber to input control information, to manage services as desired. For example, in a simple call forwarding or redirection service, the subscriber may activate or deactivate the forwarding feature and may change the 'forward to' number from time to time to route calls to different destinations.

Typically such a call forwarding service may be activated by subscribers dialing an activation code followed by a local or toll telephone or directory number (DN). Thereafter, until the subscriber dials a de-activation code, the switching system forwards all of the subscriber's calls to the thus entered forwarding directory number. In effectuating this service a party served by a local SSP switch office and who subscribes to call forwarding service has stored in the memory at the office, data identifying the party as a subscriber. In addition data is also stored at the office indicating if the service is activated and, if so, a directory number to which incoming calls are to be forwarded. When an incoming call is received the stored program of the office directs the interrogation of the memory data associated with the called station to determine if the called party subscribes to call forwarding service. If not, or if the service is not activated, the call is completed to the called station in ordinary fashion. However if a call forwarding service is active for the called party the stored program obtains the forwarding number from memory and from that point acts effectively as an originating office with respect to the new number. That is, the office may complete the call locally to the new number if it is served by the office, or it may seize an outgoing trunk to another local office or to a toll network, as the situation demands, and outpulse the new number to a distant office to complete the call. With standard call forwarding, programming is accomplished either from the subscriber's primary DN or manually by a technician at the Record Change Memory Administration Center (RCMAC), using the Remote Memory Administration System (RMAS). Conventional Call Forwarding provides an access code and a series of prompts to guide the customer through the call forwarding programming sequence. Recently there has been implemented a new feature which may be referred to as Remote Access to Call Forwarding (RACF). With Remote Access to call forwarding a subscriber can utilize any telephone equipped with DTMF signaling capability, dial a special access number, followed by a Personal Identification Number (PIN), and then dial additional codes in order to activate or deactivate the call forwarding feature.

An improved version of a system for providing such call forwarding is described in commonly assigned Hanle et al U.S. Pat. No. 5,012,511, issued Apr. 30, 1991, titled Method of and System for Control of Special Services by Remote Access. That patent is incorporated by reference herein in its entirety. One version of the system described in the Hanle et al. patent for remotely programming switches, uses multiplexing of processed recent change signals delivered to the switch. This particular version of the Hanle et al system provides very prompt, approaching virtually real time, effectuation of call forwarding instructions. In this procedure the instructions pass through and are stored in a node which may be located in a multi-services application platform (MSAP).

In a public switched telephone network, interoffice call attempts to or from a line under surveillance generate a variety of query, response and release messages between the offices, as part of the normal procedures for setting up and tearing down the calls to and from the line. According to one feature of the invention means are provided to insure that all calls to or from a line under surveillance generate signaling messages. This is accomplished according to one embodiment of the invention by setting terminating, dialing, and release triggers with respect to the target line, as well as any lines that may become associated with the target line. As a result, the end office serving the target, which may or may not be the end office to which the target's local loop line is attached, sends queries to a database on the signaling network, receives response messages, and sends release report messages, even for intraoffice calls. These messages include all of the call set-up and tear down messages, as well as the query, response and release report messages communicated between the office and the database.

A site processor, acting as a data filter, compiles data from all of the signaling messages relating to each individual call, to or from an identified telephone number or line (the target). The site processor forms a call detail record (CDR) for each call attempt relating to an identified target under surveillance. Site processors associated with multiple switches involved in surveillance activities may upload CDRs to a central file server for parsing, sorting and further processing. The server supplies composite data regarding calls to and from targets under surveillance through a data network connection to processors of one or more law enforcement agencies. The activities involved are transparent to the called and calling parties.

Caller ID signals reflect the target line despite the fact that such would not typically occur with conventional PSTN network architecture and procedures which may be utilized. Likewise billing is controlled to insure that no detail in those procedures indicates that anything but normal telephone service is involved. With respect to call forwarding, signaling information relating to installation of the service, activation and de-activation, and the identification of the forwarding number or numbers are collected at multiple nodes in the system. The necessary information to conduct surveillance on forwarded calls is then derived or forwarded from the appropriate node or nodes in order that the surveillance may be complete.

BRIEF DESCRIPTION OF DRAWINGS

The drawing figures depict the present invention by way of example, not by way of limitations. In the figures, like reference numerals refer to the same or similar elements.

BEST MODE FOR CARRYING OUT THE INVENTION

Figure 5:
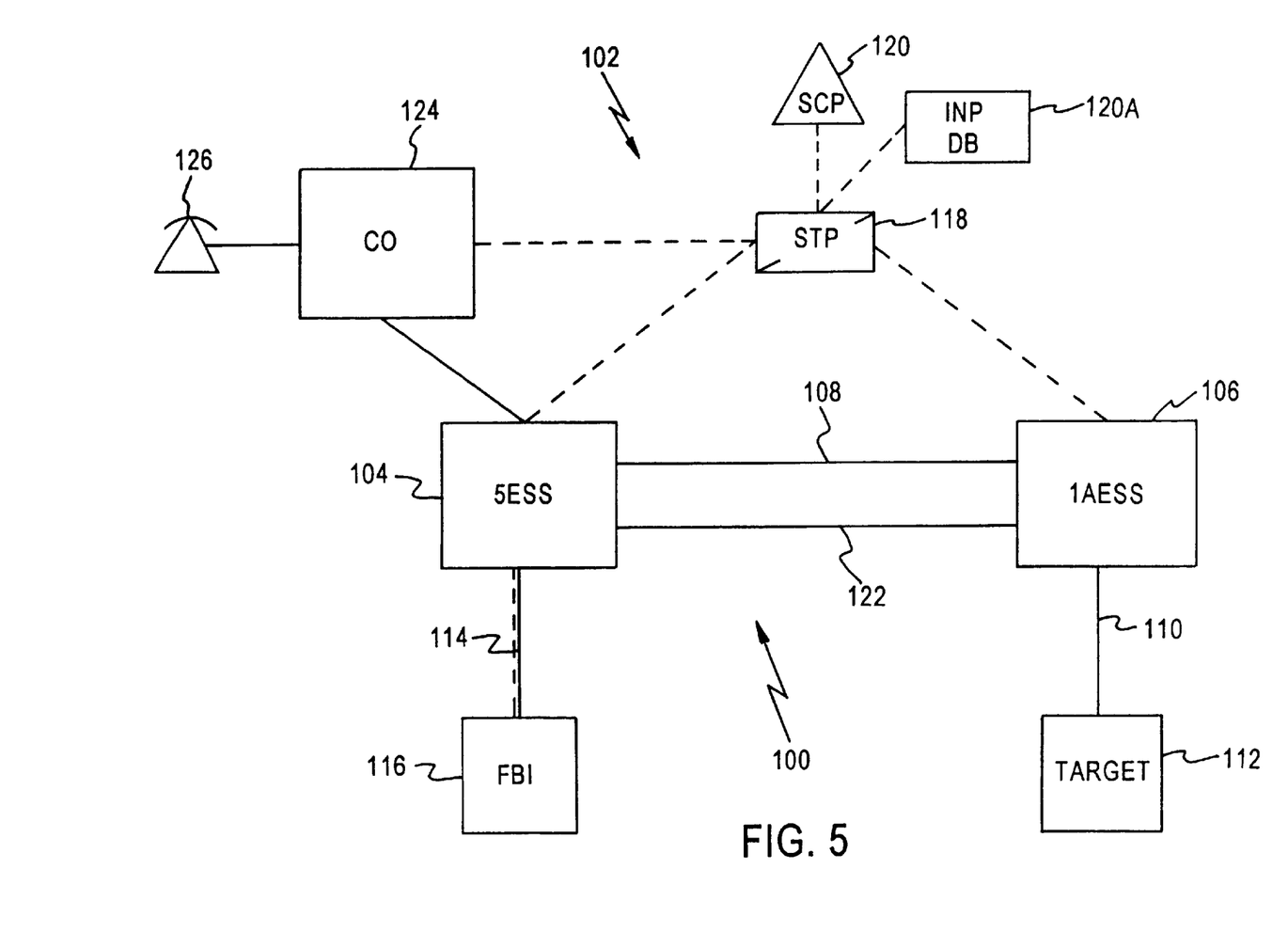
FIG. 5 is a diagrammatic illustration of a public switched telephone network and an SS7 common channel signaling network which may constitute a network used in implementing the network shown in FIG. 1 according to one embodiment of the invention.

Referring to FIG. 5 there is shown one preferred embodiment of a Public Switched Telephone Network (PSTN) arranged in an architecture adapted to being operated to implement one or more preferred methods of the invention. Referring to that figure, there is shown in diagrammatic form a Public Switched Telephone Network (PSTN) 100 having an Advanced Intelligent Network (AIN) common channel signaling (CCS) system 102. The PSTN 100 includes an end office (EO) or central office (CO) switching system 104. The switching system 104 is assumed to be a Lucent 5ESS switch for purposes of illustration. A second end office switching system is shown at 106, and this switch is assumed to be a Lucent 1AESS switch. The 1AESS switch is not subject to ready modification to implement CALEA features when used in this embodiment of the invention. The end offices 104 and 106 are connected by a trunks or trunk groups shown at 108.

These end offices 104 and 106 are located in the same LATA but are geographically spaced. The end office 106, containing the 1AESS switch, is connected by a local loop 110 to a target residence 112. The end office 104, served by the 5ESS switch, is connected by a voice and data link 114, preferably an ISDN PRI link, to premises 116, which is assumed to be occupied by the enforcement authority having the surveillance authorization, here indicated as the FBI by way of illustration. The ISDN voice and data link 114 is preferably dedicated.

The common channel signaling (CCS) advanced intelligent network (AIN), is represented by the signal transfer point (STP) 118 and service control point (SCP) 120, which may be an Integrated Services Control Point (ISCP). All of the switching offices depicted are assumed to be service switching point (SSP) capable. The STP is linked to the two end offices 104 and 106 by data links shown by broken lines. Likewise the STP is shown linked to the SCP by a data link shown as a broken line.

In 1996, the Federal Communications Commission (FCC) released the "First Report and Order and Further Notice of Proposed Rulemaking," which requires Local Number Portability (LNP) in the top MSAs (Metropolitan Statistical Areas) by the end of 1998. Implementation of LNP is now well under way but is by no means a universally available service. It is a feature of this invention that it not only utilizes the capabilities of LNP where it exists, but also provides the surveillance service seamlessly through areas with as well as without LNP capability. LNP capability in FIG. 5 is represented by the LNP database 120A connected by data link to the STP 118.

In order to accomplish the purposes of the invention according to this embodiment, CALEA capabilities are first established in the office 104, which contains the more feature rich 5ESS switch. To this end the 5ESS switch is provided with a CALEA module which comprises a processor and processor program and data store. The CALEA module is in two way data communication and one way voice communication with the administrative module of the 5ESS switch as is later described in detail with respect to FIG. 6. The switch having the CALEA module is herein sometimes referred to as the CALEA switch.

Figure 1:
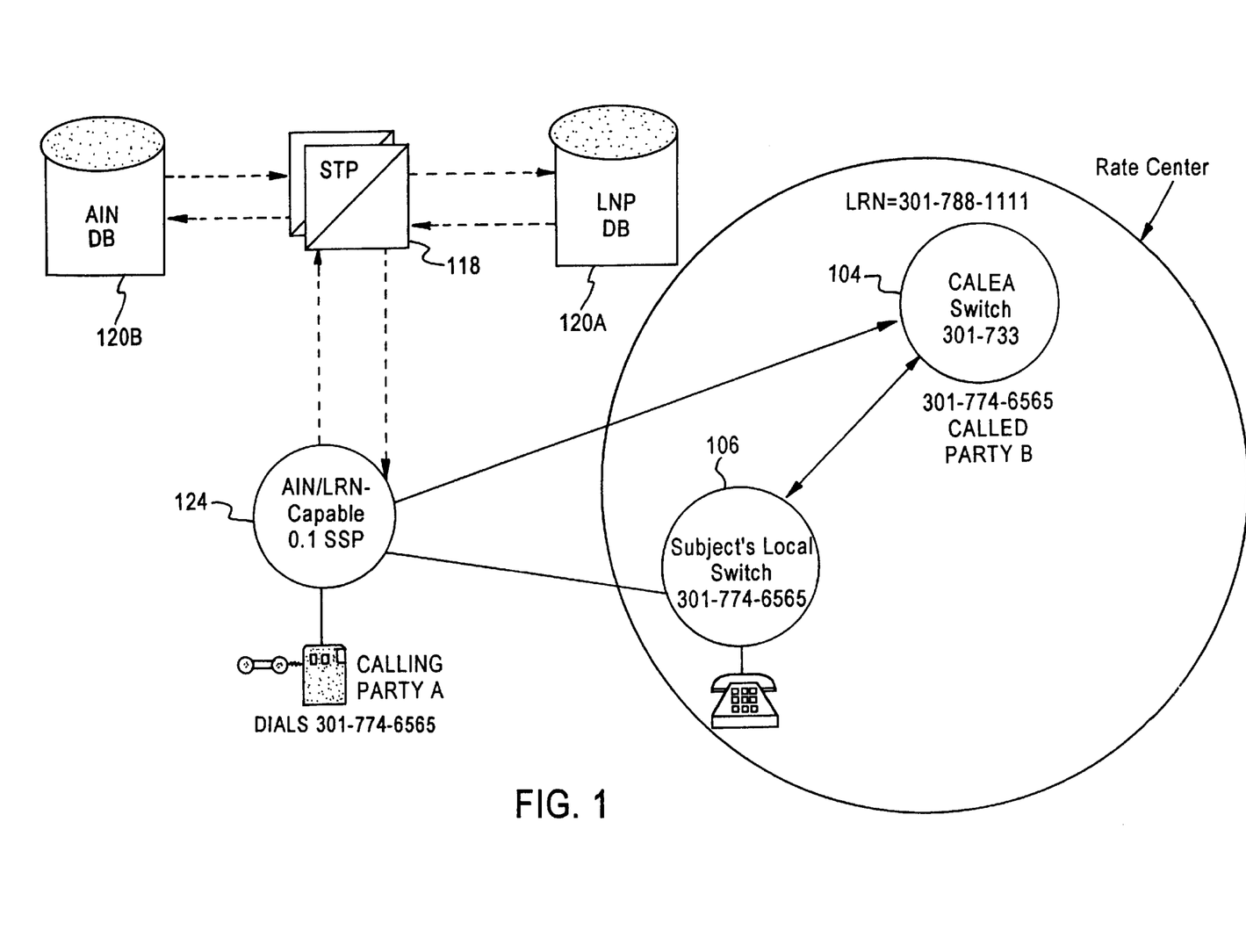
FIG. 1 is a diagrammatic illustration of an illustrative network architecture for a CALEA capable telephone network in which an incoming call flow is diagrammed according to one preferred embodiment of the invention.

Referring to FIG. 1 there is shown a different depiction of the same basic network as has been previously described with respect to FIG. 5. Like reference numerals have been used where applicable. The database (DB) 120B is associated with the SCP 120 in FIG. 5. The NPA-NXX (301-774) of the intercept subject is established in all End Offices (EOs), tandems, and Operator Service Switches as a six digit AIN LNP trigger. LNP is presently provisioned in most metropolitan areas. As a result, it has been found feasible to implement surveillance by treating the telephone number of the intercept subject as if it was a ported telephone number in the LNP world. The 301-774 exchange is opened up as if it was ported to that number. Then when a calling party dials any 301-774 number, it will automatically trigger to an LNP database which exists because the 774 exchange is ported, and it will look to see if the last four digits 6565, in fact, constitute a ported number.

The trigger is activated whenever someone attempts to dial the intercept subject. When the trigger is activated it pauses or suspends the call processing for a moment while a query is launched to the LNP database 120A. If it is confirmed that the person dialed the Intercept Subject's number 301-774-6565, the SCP will change the Called Party Number to the LRN (301-7881111) and return an Analyze Route response message to the switch. The switch will detect the change in the Called Party Number and will insert the Called Party Number into the Generic Address Parameter (GAP) and route the call to the LRN (in this instance the CALEA) switch. When the call arrives at the 301-788-1111 LRN, it will recognize that the Called Party Number is its LRN and it will replace the Called Party Number with the GAP number, which is 301-774-6565. The CALEA switch will now complete the call to 301-774-6565.

At the same time the CALEA switch will encounter or activate a previously set AIN Terminating Attempt Trigger (TAT). The call will be suspended or paused momentarily and a query will be launched to the AIN SCP. The SCP will return a Forward Call message to 301-774-6565. The SSP will now forward the call to the Subject's local Central Office and the call will be complete to the Subject's telephone. The CALEA module or feature will have the ability to capture the intercept subject's incoming call data and, if authorized, monitor the call content.

In the situation where, for various reasons, both LNP and 3-6-10 triggers may exist, the 3-6-10 trigger will take precedence over the LNP trigger as the more specific trigger. This is unexpectedly significant and affords a surprising opportunity to provide improved surveillance in addition to porting service. Thus, assume the situation where LNP is implemented and a 301-774 code is directed to a specific switch for all 301-774 subscribers who choose to port their numbers. For the purposes of implementing CALEA as opposed to conventional porting, it is now possible to use a 3-6-10 digit trigger instead of the conventional six digit LNP trigger, in order to direct the CALEA call to a different switch specifically established for handling CALEA calls. Thus it is possible to use this difference in trigger specificity to control the selection of the switching equipment to which different types of calls are directed for handling.

On an outgoing call from the intercept subject, the subject picks up the telephone to make a call and receives dialtone from their local end office. After dialing the telephone number the telephone will encounter a previously set AIN Off-Hook-Delay (OHD) Trigger. A query is now launched to the AIN SCP. The SCP will place the Called Number in the Charge Number field and replace it with the LRN of the CALEA office (301-788-1111), and return the message back to the SSP. The SSP will recognize the change, treat the call as an LNP call, and route it to the CALEA office. The CALEA office will swap parameters like any LNP call, and attempt to route the call to 301-774-6565. This will now activate a Terminating Attempt Trigger (TAT) trigger and launch a query to the AIN SCP. The SCP will notice that the Calling Number is the number of the subject, and will place the Charge Number into the Called Number field, and return the call the SSP. The SSP will now route the call as dialed by the Subject. All call data and call content may now be monitored by law enforcement agencies.

Figure 2:
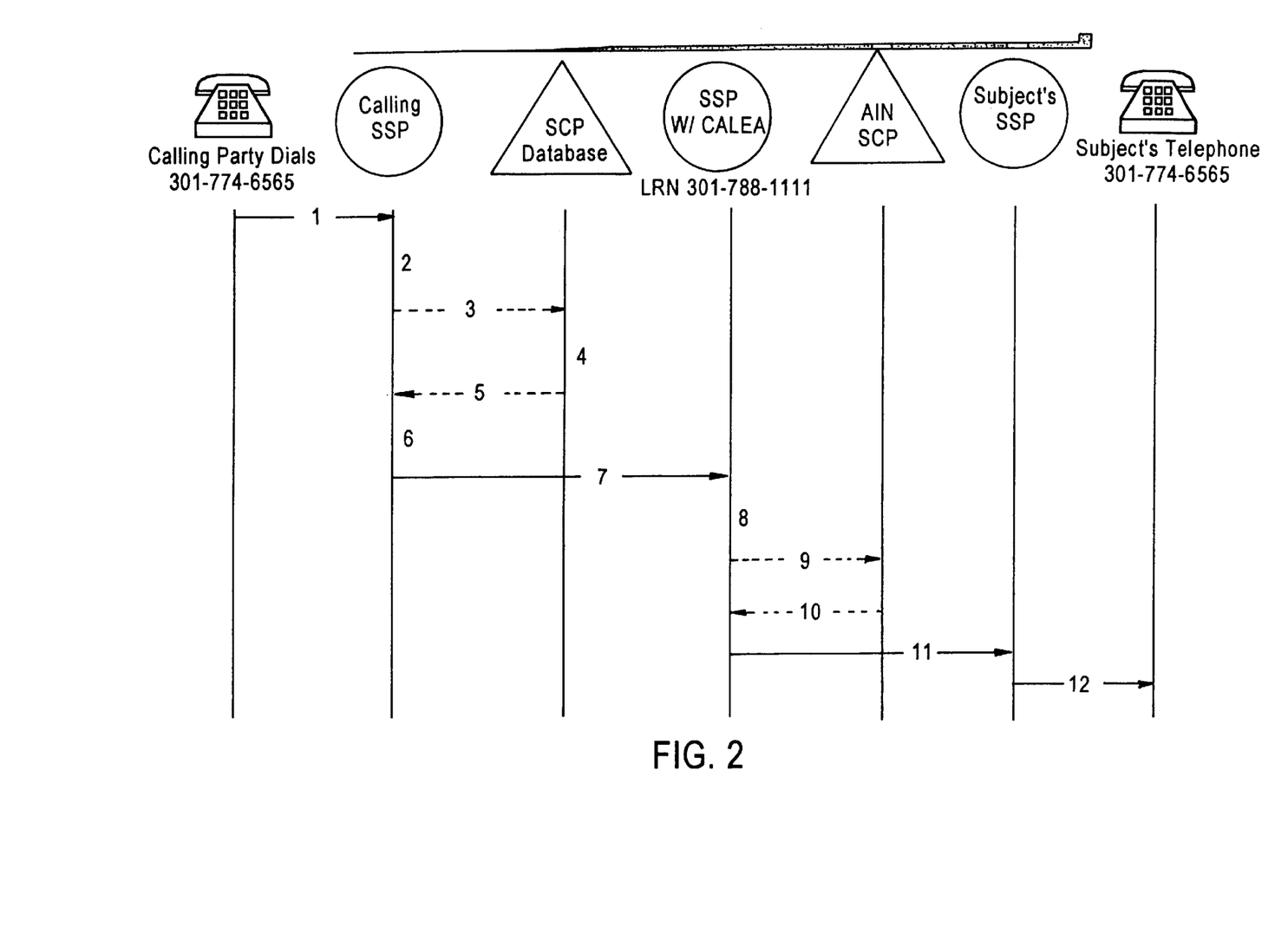
FIG. 2 shows a call flow diagram for an incoming call such as the illustrative incoming call typified in FIG. 1.

Referring now the FIG. 2 there is shown the details of call flow for an incoming call.

At 1 the Calling Party picks up the telephone and dials the Intercept Subject on 301-774-6565, in a normal manner.

At 2 the switch of the local Central Office of the Calling Party will recognize that this is a call to 301-774, which is a ported NPA-NXX, and will activate an LNP AIN trigger. If this call had not been to a ported code the call would have progressed normally without activating the trigger.

At 3 the call is momentarily paused or suspended and a query is launched to the SCP Database.

At 4 the SCP Database will determine that 301-774-6565 is a ported number and will change the Called Number to the LRN at the CALEA SSP (301-788-1111).

At 5 the SCP will return an analyze route message to the SSP.

At 6 the SSP will determine that the Called Number and Generic Address Parameter (GAP) are different, and it will change the contents of the GAP so that it contains the original called number of 301-774-6565.

At 7 the SSP will route the call to 301-788-1111, which is the LRN of the CALEA capable SSP.

At 8 the CALEA capable SSP will notice that the called number is its assigned LRN and will insert the GAP number which is 301-774-6565 in the Called Number Field.

At 9 the CALEA SSP will now route the call to the intercept subject's number in the CALEA office. This will incur a TAT trigger and a query will be launched to the AIN SCP.

At 10 the SCP returns a forward call message to the SSP with the subject's number 301-774-6565.

At 11 the CALEA office forwards the call to the subject's local office.

At 12 the call is terminated onto the subject's telephone and surveillance monitoring may begin.

Figure 3:
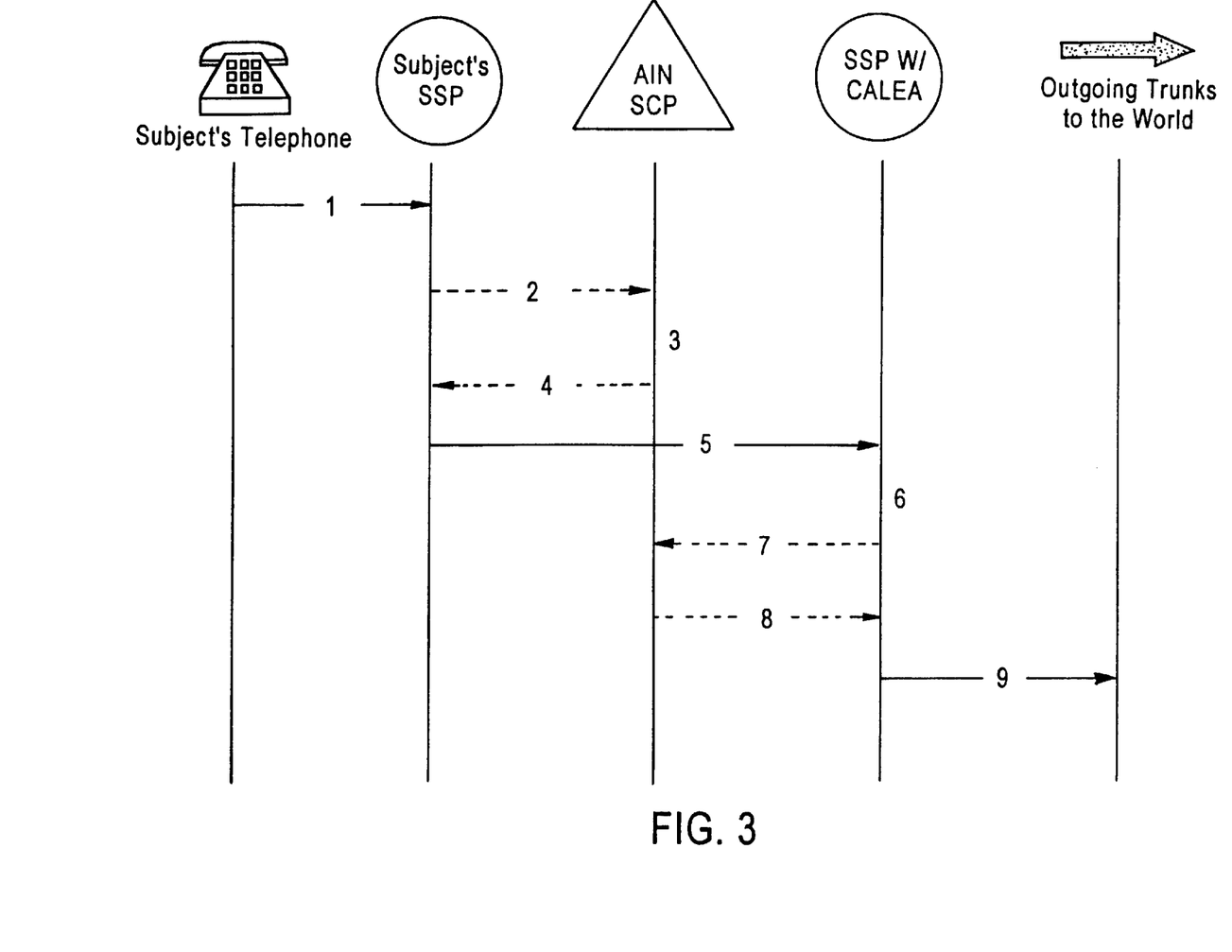
FIG. 3 presents a call flow diagram for an outgoing call in a network such as illustrated in FIG. 1.

FIG. 3 illustrates the detail of an outgoing call by the intercept subject.

At 1 the intercept subject picks up the telephone to make a call and receives dial tone from the local end office. Following the number being dialed, the call will incur an Off-Hook-Delay trigger.

At 2 an AIN query is launched to the AIN SCP.

At the SCP as indicated at 3, the Called Number will be placed in the Charged Number field, the LRN of the CALEA office placed in the Called Number field, and the Subject's Number placed in the GAP field.

At 4 the SCP will return an "analyze route message" to the SSP.

At 5 the SSP will change the GAP parameter to Original Called Number and route the call to the CALEA office.

At 6 at the CALEA office the LRN is removed and replaced with the GAP Number (301-774-6565). The SSP will attempt to route the call but will incur the AIN TAT trigger.

At 7 a query will be launched to the AIN SCP. The SCP will notice that the number of the Subject is in the Calling Number field, and will therefore replace the Called Number with the number in the Charged Number field.

At 8 a forward call message will be returned to the SSP.

At 9 the SSP will route the call to the Called Number (301-774-6565) with all CALEA monitoring features.

Figure 4:
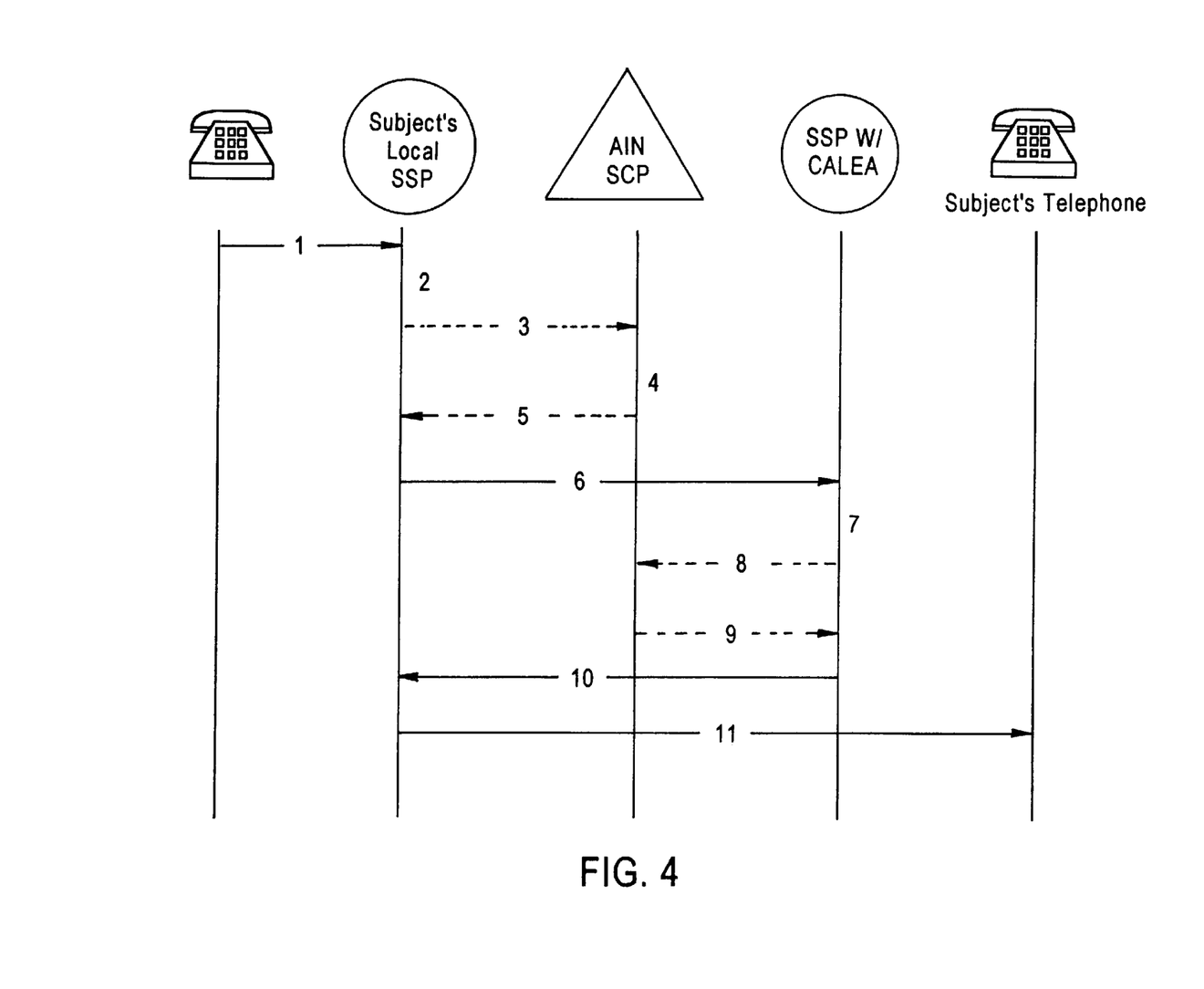
FIG. 4 presents a call flow diagram for an intraoffice incoming call as it may flow in a network of the type shown in FIG. 1.

It is a feature of the invention of the methodology of the invention that surveillance is also made effective for incoming intra-office calls to the intercept subject. FIG. 4 shows detail of the flow of a call of this type.

At 1 a person served by the intercept subject's local Central Office places a call to the intercept subject on 301-774-6565.

At 2 the local office is provisioned with a Public Office Dialing Plan (PODP) trigger which will be incurred whenever 301-774-6565 is dialed by anyone in that office.

At 3 a query is launched to the AIN SCP.

At 4 the AIN SCP will change the Called Number to the LRN 301-788-1111.

At 5 the SCP will return an analyze route message to the SSP, which will determine that the Called Number and Generic Address Parameter (GAP) are different and will change the GAP to the original called number of 301-774-6565.

At 6 the local SSP will route the call to 301-788-1111, which is the LRN of the CALEA capable SSP.

At 7 the CALEA capable SSP will notice that the Called Number is its assigned LRN and will insert the GAP number 301-774-6565 in the Called Number Field and attempt to route the call to 301-774-6565. However the call will encounter a TAT trigger.

At 8 a query will be launched to the AIN SCP.

At 9 the SCP returns a Forward Call message to the SSP with the subject's number 301-774-6565.

At 10 the CALEA office forwards the call to the subject's local office.

At 11 the call is terminated onto the subject's telephone and monitoring may begin.

It will be appreciated by those skilled in the art that this approach obviates many of the provisioning questions which previously raised issues. Among these are the following: Call Forwarding Features, CLASS Services, ISDN Features, Transfer of the Loop, and Centrex and Multi-Line Hunt Groups. At the same time many of the service incosistencies are also solved with this new architecture and methodology. Among these are the following: Custom ISDN Service, Switch Specific CPE MADN sets and P-Phones, ISDN Packet Data, ISDN Service Profile Identifier (SPID),Call Waiting Tone, IdentaRing, Switch Based Announcements, Network ased voice mail services, CustoPAK, and CustoFlec 2100.

Because the functioning of the invention is dependent upon the operation of CALEA modified switching systems, the architecture and operations of such a switching system, such as a CALEA modified 5ESS, the operation of such a switch is described. The addition of a CALEA module to this switch is then discussed.

Figure 6:
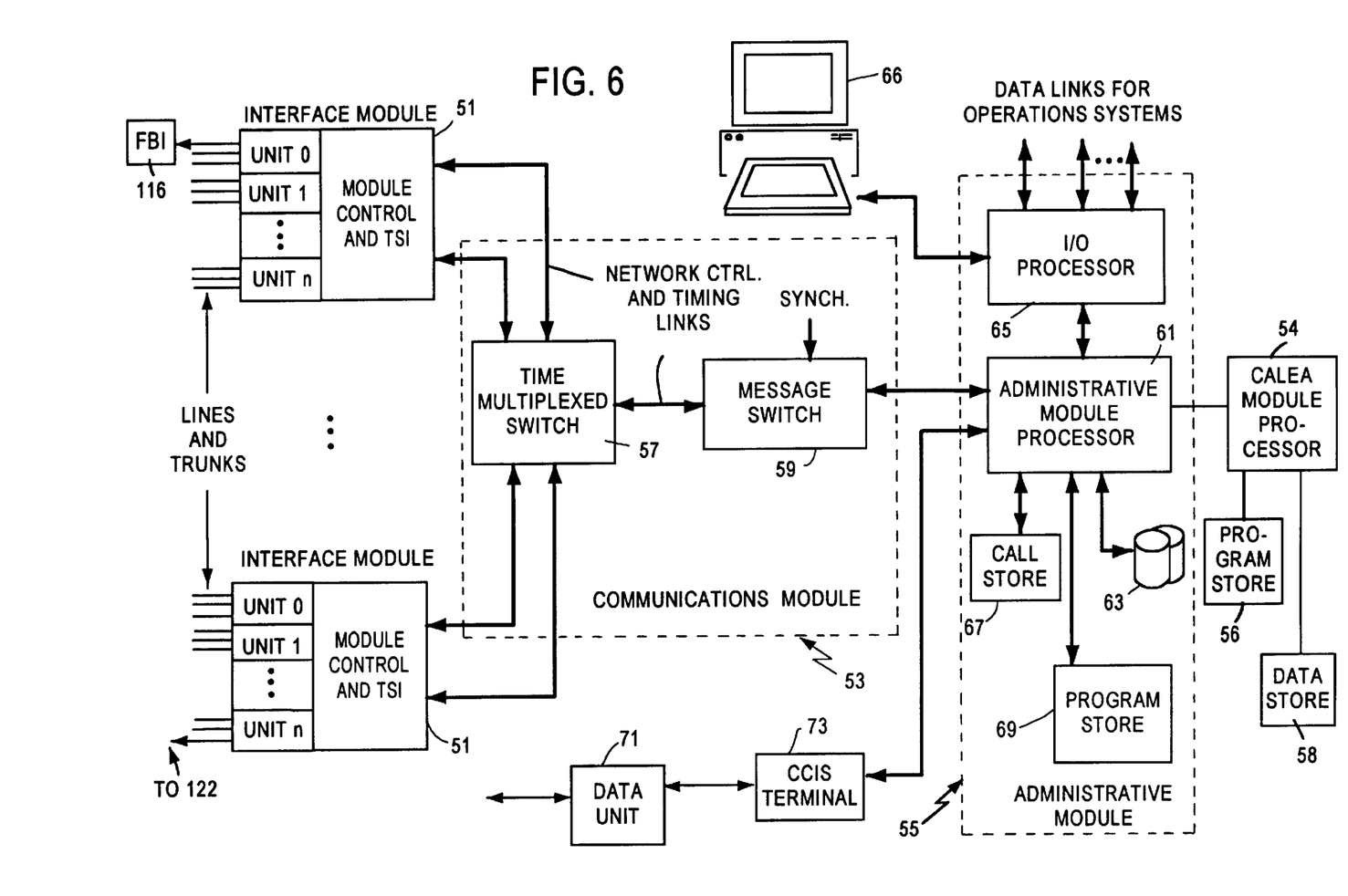
FIG. 6 shows a simplified block diagram of an electronic program controlled switch of the SSP type, which has been modified pursuant to one preferred embodiment of the invention to impart CALEA capabilities to the switch.

FIG. 6 shows a simplified block diagram of an electronic program controlled switch of the SSP type. As illustrated, the switch includes a number of different types of modules. In particular, the illustrated switch includes interface modules 51 (only two of which are shown), a communications module 53 and an administrative module 55.

The interface modules 51 each include a number of interface units 0 to n. The interface units terminate lines from subscribers' stations, trunks, T1 carrier facilities, etc. Each such termination is identified by an OE number. Where the interfaced circuit is analog, for example a subscriber loop, the interface unit will provide analog to digital conversion and digital to analog conversion. Alternatively, the lines or trunks may use digital protocols such as T1 or ISDN. Each interface module 51 also includes a digital service unit (not shown) which is used to generate call progress tones and receive and detect dialed digits in pulse code or dualtone multi-frequency form.

In the illustrated embodiment, the unit 0 of the upper interface module 51 provides an interface for the signaling and communication links to an enforcement agency terminal 122 shown in FIG. 5. In this implementation, the links preferably consist of one or more ISDN PRI circuits each of which carries 23 bearer (B) channels for communication traffic (content traffic) and one data (D) channel for signaling data. The connection may be referred to as a half tap because it is unidirectional. The enforcement authority, such as the FBI receives the authorized data and content but is isolated from the target. This is also essential in order that the surveillance be maintained transparent to both the target and any calling party in contact with the target.

Each interface module 51 includes, in addition to the noted interface units; a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the timemultiplexed switch 57 and a message switch 59. The time multiplexed switch 57 provides time division transfer of digital voice data packets between voice channels of the interface modules 51 and transfers signaling data messages between the interface modules. The switch 57, together with the TSIs of the interface modules, form the overall switch fabric for selectively connecting the interface units in call connections.

The message switch 59 interfaces the administrative module 55 to the time multiplexed switch 57, so as to provide a route through the time multiplexed switch permitting two-way transfer of control related messages between the interface modules 51 and the administrative module 55 and the CALEA module processor 54 and its program store 56 and data store 58. In addition, the message switch 59 terminates special data links, for example a link for receiving a synchronization carrier used to maintain digital synchronism.

The administrative module 55 and its adjunct CALEA module 54 provide high level control of all call processing operations of the switch. The administrative module 55 includes an administrative module processor 61, which is a computer equipped with disc storage 63, for overall control of central office (CO) operations. Likewise the CALEA processor is a computer equipped with a disk storage 56 which contains one or more CALEA programs or applications which are run to effect control of the associated switching system to implement CALEA operations and functions. These are specified in detail in the above-mentioned PS or PN 3580 which is incorporated by reference herein in its entirety. The CALEA data store serves as a database of tables and data reflecting the treatment to be accorded telephone or other subscriber terminals authorized for surveillance in accord with the limits of the authorization which is applicable. The data store 58 also serves as a repository of the information derived from signaling messages by the processor 54. As such the data store may contain the filtered results from all of the signaling messages relating to each individual call, to and from an identified telephone number or line. The CALEA processor or site processor forms a call detail record (CDR) for each call attempt relating to an identified target under surveillance. In the case where a number of CALEA modules are involved and associated with different switches the various site processors may upload CDRs to a central file server (not shown) for parsing, sorting and further processing. The server may supply composite data regarding calls to and from targets under surveillance through a data network connection to one or more law enforcement agencies.

The administrative module processor 61 communicates with the interface modules 51 through the communication module 55. The administrative module 55 may include one or more input/output processors (not shown) providing interfaces to terminal devices for technicians and data links to operations systems for traffic, billing (AMA), maintenance data, etc.

A CCS terminal 73 and an associated data unit 71 provide an SS7 signaling link between the administrative module processor 61 and CALEA module processor 54 and one of the signal transfer points (STPs) in the Advanced Intelligent Network (AIN). Although only one such link is shown, preferably there are a plurality of such links providing redundant connections to both STPs of a mated pair and providing sufficient capacity to carry all necessary signaling to and from the particular end office 104. The SS7 signaling through the terminal 73, the data unit 71 and the STPs provides two-way signaling data transport for call set-up related messages to and from other offices. These call set-up related messages typically utilize the ISDN-UP (ISDN-users part) protocol portion of SS7. The SS7 signaling through the terminal 73, the data unit 71 and the STPs also provides two-way signaling data transport for communications between the end office 104 and database systems or the like, such as the SCP 120. The communications between the office 104 and the database systems or the like utilize the TCAP (transactions capabilities applications part) protocol portion of SS7.

As illustrated in FIG. 6, the administrative module 55 also includes a call store 67 and a program store 69. Although shown as separate elements for convenience, these are typically implemented as memory elements within the computer serving as the administrative module processor 61. The program store 69 stores program instructions which direct operations of the computer serving as the administrative module processor 61.

For each call in progress, a register assigned within the call store 67 stores translation and user profile information retrieved from disc storage 63 together with routing information and any temporary information needed for processing the call. For example, for a residential customer initiating a call, the call store 67 would receive and store line identification and outgoing call billing information corresponding to an off-hook line initiating a call. A register in the call store is assigned and receives profile data from the disc memory both for originating subscribers on outgoing calls and for terminating subscribers on incoming calls. According to the invention the outgoing billing information and the target profile data may be modified both pursuant to signaling from the CALEA module and signaling received from the SCP.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

We claim:

1. A method of communicating via a switched telephone network comprising:

a) equipping a first program controlled switching node in said network with a first processor and storage compiling surveillance data regarding communications with stations subject to surveillance;

b) programming a first controller including a processor and storage to control routing in said network, and compiling in said storage data identifying said stations subject to surveillance;

c) programming a second processor and storage to control number portability routing, and compiling in said storage data identifying stations subject to having their numbers ported;

d) monitoring dialed numbers at program controlled switching nodes in said network, detecting the dialing of a number subject to surveillance, and routing the detected call to said first program controlled switching node in said network with said first processor and storage;

e) processing data derived from the routing of said detected call in said processor and storage;

f) monitoring dialed numbers at program controlled switching nodes in said network, detecting the dialing of an NPA-NXX subject to porting, and routing the detected call to the NPA-NXX porting node.

2. A method according to claim 1 wherein said NPA-NXX routing is conducted only in the absence of said surveillance routing.

3. A method according to claim 1 wherein said monitoring at said switching nodes is conducted at least partially by establishing Serial Digit String (SDS) triggers at said switching nodes.

4. A method according to claim 3 wherein at least some of said SDS triggers are 3-6-10 SDS triggers.

5. A method according to claim 3 wherein said monitoring at switching nodes is conducted at least partially by establishing NPA-NXX number portability triggers at said switching nodes.

6. A method according to claim 3 wherein said Serial Digit String (SDS) triggers supersede said NPA-NXX triggers.

7. A method of providing surveillance of communications with designated telephone stations in accord with mandated standards in switched telephone networks wherein the requisite surveillance functionality resides in a limited number of switching offices, comprising:
   a) detecting through local number portability techniques in intelligent network processing an attempt to establish a call to one of said designated stations connected to an end office without said requisite surveillance functionality;
   b) porting the NPA-NXX of said designated number to a switching office having said requisite surveillance functionality;
   c) determining from a local number portability storage that said designated number is scheduled for surveillance;
   d) completing said call through said switching office having said requisite surveillance functionality to said designated number and compiling said mandated data with relation to said call.

8. A method according to claim 7 including the steps of detecting through common channel signaling intelligent network processing an attempt to establish a call to one of said designated stations connected to an end office without said requisite surveillance functionality; determining from a storage associated with a controller for said common channel signaling intelligent network that said designated number is scheduled for surveillance; and completing said call through said switching office having said requisite surveillance functionality to said designated number and compiling said mandated data with relation to said call.

9. A method according to claim 8 wherein said detecting through common channel signaling intelligent network processing an attempt to establish a call to one of said designated stations is conducted at least partially by establishing Serial Digit String (SDS) triggers at said switching nodes.

10. A method according to claim 7 including the steps of detecting through common channel signaling intelligent network processing an attempt to establish a call to one of said designated stations connected to an end office without said requisite surveillance functionality; determining from a storage associated with a controller for said common channel signaling intelligent network that said designated number is scheduled for surveillance; and completing said call through a switching office having said requisite surveillance functionality to said designated number and compiling said mandated data with relation to said call.

11. A switched telephone network comprising switching systems connected by trunks and serving customer premise equipment via links between said equipment and said switching systems, a separate control network having a controller controlling routing; said controller having a database having stored therein data relating to the identity of customer premise equipment subject to surveillance; a local number portability database having stored therein data relating to the identity of customer premise equipment subject to surveillance; at least one switching system having the capability for carrying out mandated surveillance; at least one of said databases having the capability of cooperating with a processor associated therewith to route a call to at least one switching system having the capability for carrying out mandated surveillance.

12. A method for providing surveillance of the use of predetermined telephone terminals connected in a switched telephone network comprising switches of varying types and capabilities, pursuant to predetermined surveillance specifications, comprising the steps of:
   a) providing at least one of said switches with a capability to perform said surveillance to said specifications;
   b) using local number portability techniques or intelligent processing in a common channel signaling system to port to said at least one of said switches communication subject to surveillance, which communication originates or terminates at a telephone terminal connected to one of said switches not possessing a capability to perform said surveillance; and
   c) using said surveillance capability of said at least one of said switches to provide specified surveillance data.

13. A method comprising:
   a) activating a point in call trigger in a telephone network first signal switching point (SSP) by dialing into that SSP the telephone number of a telephone designated for surveillance, wherein the NPA-NXX of said number is a ported NPA-NXX;
   b) determining at a signal control point (SCP) that the dialed number is a ported number and changing the dialed number to the local route number (LRN) at a surveillance capable second signal switching point (SSP) and returning a message to said first SSP;
   c) said first SSP responsive to said message routing the call to said surveillance capable second SSP, said second SSP initiating its surveillance activity, and forwarding said call to a third SSP which constitutes the local SSP to said telephone having said number designated for surveillance; and
   d) connecting said call to said telephone designated for surveillance, and conducting said call under said surveillance.

14. A method according to claim 13 wherein the NPA-NXX of said surveillance capable second signal switching point (SSP) is different than the ported NPA-NXX.

15. A method according to claim 14 wherein a serial digit string (SDS) trigger is used to send said call to said surveillance capable second signal switching point with said different NPA-NXX.

16. A method according to claim 15 wherein said SDS trigger comprises a 3-6-10 SDS trigger.

17. A method according to claim 13 wherein said point in call trigger activated in said first SSP comprises a LRN local number portability type trigger.

18. A method comprising:
   a) activating a point in call trigger in a telephone network first signal switching point (SSP) by dialing into that SSP the telephone number of a telephone designated for surveillance;
   b) determining at a signal control point (SCP) that the dialed number is a number designated for surveillance and changing the dialed number to the local route number (LRN) at a surveillance capable second signal switching point (SSP) and returning a message to said first SSP;

c) said first SSP responsive to said message routing the call to said surveillance capable second SSP, said second SSP initiating its surveillance activity, and forwarding said call to a third SSP which constitutes the local SSP to said telephone having said number designated for surveillance; and d) connecting said call to said telephone designated for surveillance, and conducting said call under said surveillance.

19. A method according to claim 18 wherein said point in call trigger comprises a serial digit string (SDS) trigger.

20. A method according to claim 19 wherein said SDS trigger comprises a 3-6-10 trigger.

* * * * *